(12) United States Patent
Park

(10) Patent No.: US 10,585,283 B2
(45) Date of Patent: Mar. 10, 2020

(54) HEAD MOUNTED DISPLAY AND CONTROL METHOD THEREFOR

(71) Applicant: LG ELECTRONICS INC., Seoul (KR)

(72) Inventor: Yonghahk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 15/576,217

(22) PCT Filed: Aug. 24, 2015

(86) PCT No.: PCT/KR2015/008810
§ 371 (c)(1),
(2) Date: Nov. 21, 2017

(87) PCT Pub. No.: WO2016/190489
PCT Pub. Date: Dec. 1, 2016

(65) Prior Publication Data
US 2018/0146189 A1 May 24, 2018

(30) Foreign Application Priority Data
May 27, 2015 (KR) .................. 10-2015-0074211

(51) Int. Cl.
H04N 13/344 (2018.01)
G02B 27/01 (2006.01)
G06F 3/01 (2006.01)
H04N 21/234 (2011.01)
G02B 26/02 (2006.01)

(52) U.S. Cl.
CPC ....... *G02B 27/017* (2013.01); *G02B 27/0172* (2013.01); *G06F 3/011* (2013.01); *H04N 13/344* (2018.05)

(58) Field of Classification Search
CPC .............. G02B 27/0172; G02B 26/026; G06T 15/00–503; G06T 13/40; G06T 5/20; G09G 3/003; H04N 21/23439
See application file for complete search history.

(56) References Cited

U.S. PATENT DOCUMENTS 9,332,285 B1 * 5/2016 Grant ............... H04N 21/23439
2009/0195641 A1 * 8/2009 Neuman ................ H04N 13/10
348/47
2011/0273543 A1 * 11/2011 Ushio ................ G02B 27/0172
348/54
(Continued)

FOREIGN PATENT DOCUMENTS

JP       2004-363987 A      12/2004
KR    10-2013-0101380 A      9/2013
(Continued)

*Primary Examiner* — Lin Li
(74) *Attorney, Agent, or Firm* — Birch, Stewart, Kolasch & Birch, LLP

(57) ABSTRACT

The present specification relates to a head mounted display and a control method therefor, the subject matter thereof relates to: receiving a rendered frame from a computing device on the basis of first sensing information; time-warping the received frame on the basis of second sensing information; processing the frame time-warped on the basis of the second sensing information; and displaying the processed frame on a screen.

13 Claims, 12 Drawing Sheets

(56) References Cited

U.S. PATENT DOCUMENTS

2012/0068913 A1\* 3/2012 Bar-Zeev ............. G02B 26/026
                                                    345/8
2015/0049004 A1\* 2/2015 Deering ............. G02B 27/0172
                                                    345/8

FOREIGN PATENT DOCUMENTS

| KR | 10-2014-0033144 A | 3/2014 |
| KR | 10-2014-0126492 A | 10/2014 |
| WO | WO 2014/178477 A1 | 11/2014 |

\* cited by examiner

FIG. 7
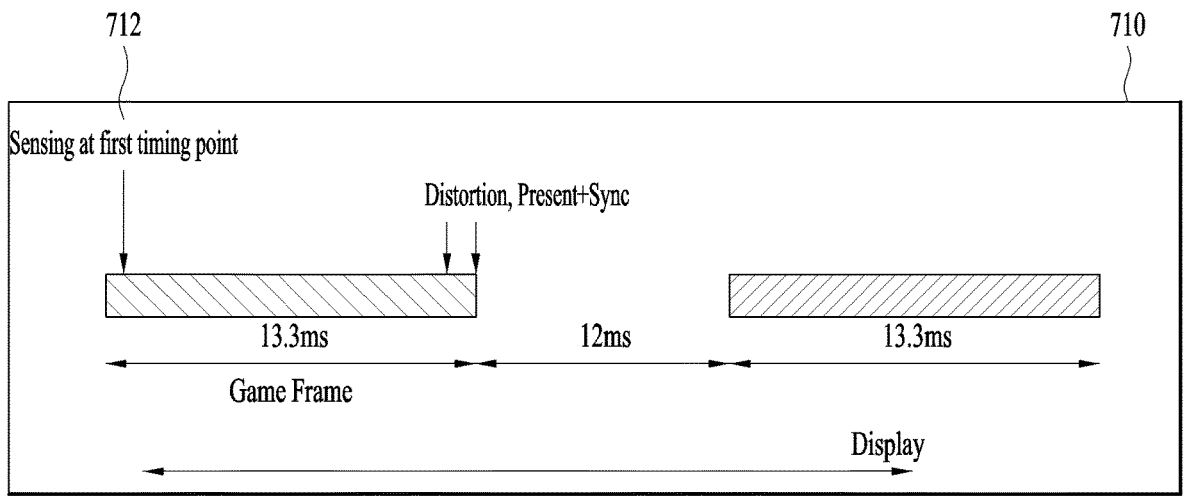
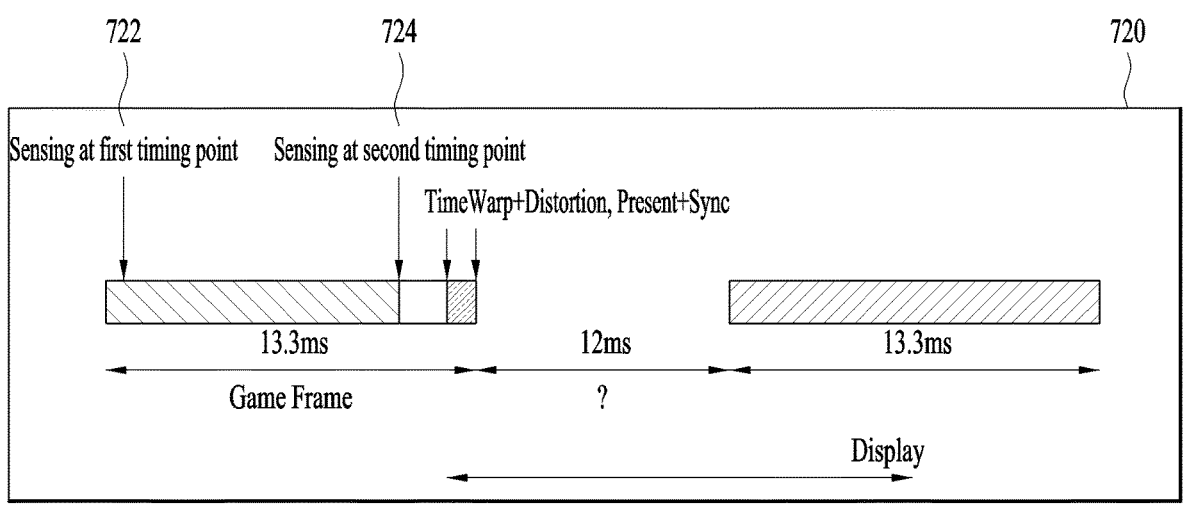
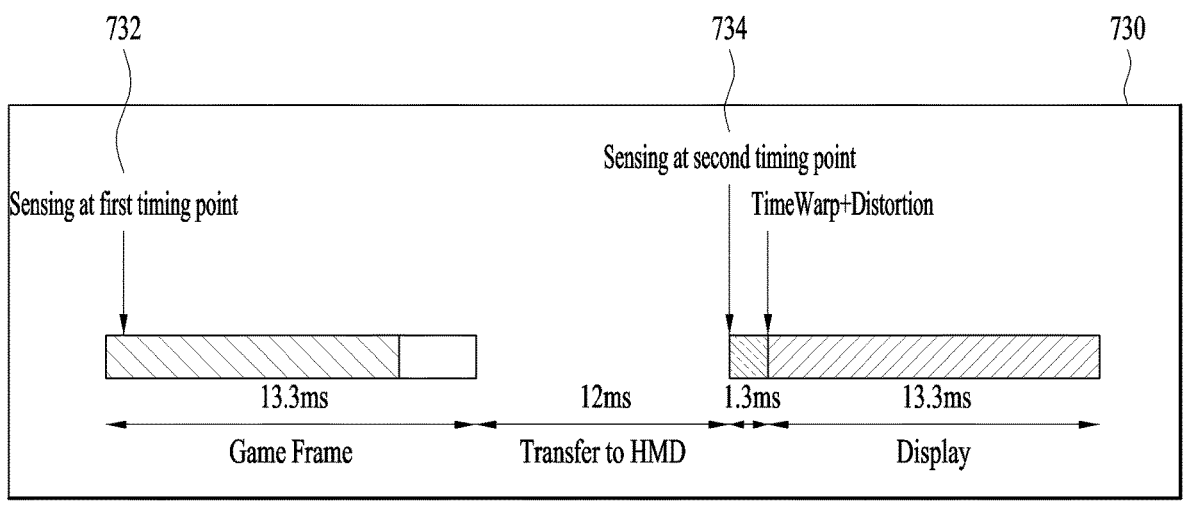

HEAD MOUNTED DISPLAY AND CONTROL METHOD THEREFOR

CROSS REFERENCE TO RELATED APPLICATIONS:

This application is the National Phase of PCT International Application No. PCT/KR2015/008810, filed on Aug. 24, 2015, which claims priority under 35 U.S.C. 119(a) to Patent Application No. 10-2015-0074211, filed in the Republic of Korea on May 27, 2015, all of which are hereby expressly incorporated by reference into the present application.

TECHNICAL FIELD

The present invention relates to a head mounted display and controlling method thereof, and more particularly, to a head mounted display and controlling method thereof, suitable for preventing a user from feeling dizzy on watching a screen in a manner of receiving a frame rendered to be appropriate for a 2-dimensional plane or curved display from a computing device, time-warping the received frame to fit an orientation calculated based on sensing information right before outputting the rendered frame to a display, and reducing a delay time (motion to photon latency) of actually outputting an image to the display from an orientation sensing timing of a user head by distorting the changed frame to fit an optical structure such as a lens and the like.

BACKGROUND ART

Owing to the recent development of IT technology, a head mounted display is a rising big issue in everyday life. Particularly, a head mounted display is utilized as a communicating tool for performing essential functions in daily life in association with various programs and applications.

Virtual reality (VR) relates to a technology of providing a reality-like experience through interaction between a virtual space established using a computer and a human sensory system and means a fictional situation or environment rendered using a computer. Herein, the rendered virtual environment or situation stimulates user's sense and enables a user to have a spatial and temporal experience similar to reality, thereby making it look as if happening actually in reality.

If using virtual reality (VR) devices, a user can feel such virtual reality more realistically and be immersed in a virtual reality world by frequently crossing reality and virtual space more easily. As a VR device works as a means for controlling user's motion and experience in such a virtual reality word, since the VR device can interact with targets in the VR world, it is characterized in that each user can have a different experience.

So far, VR devices form small-scale markets in partial fields such as amusement culture (e.g., games, theme parks, etc.) and military computer simulations. Yet, as industry is being developed, the VR technology utilized fields are expanding gradually. VR devices can be utilized across various fields such as archeology, architecture, fine art, music, medical care and the like as well as across well-known fields such as manufacturing business, shopping, military, education and the like.

Particularly, in case of a medical field, as the VR technology is used for metal treatment of PTSD (posttraumatic stress disorder) and the like, the VR related market is possibly regarded as a quickly growing market in the future.

Recently, owing to the developments of smartphones, tablets and the like, the general public can experience virtual reality or augmented reality more easily and have decreased repulsion, they are further interested in VR devices.

In VR (virtual reality), there is the concept of 'presence' meaning appearance before one's eyes, which means that a user is made to recognize himself as existing in a virtually configured non-physical world by providing a high sense of immersion. In forming such an experience of presence, an obstacle is a delay time (motion to photon latency).

The delay time is a time taken for a photon to arrive at user's eye by reflecting user's motion from a moment of starting the user's motion on a real screen, and means a time difference between a movement of user's eyes and a corresponding screen update. Minimizing the delay time is a decisive factor in providing a convenient VR use environment.

However, since it frequently happens that a delay time is equal to or greater than 20 ms in the related art, as people usually feel dizzy or nausea on running a VR program, there is a problem that a user feels inconvenience.

DISCLOSURE OF THE INVENTION

Technical Task

One technical task of the present invention is to provide a head mounted display and controlling method thereof, which can implement a more natural VR screen by reducing a delay time in a manner of receiving a rendered frame based on a first sensing information from a computing device and time-warping and distorting the frame based on a second sensing information.

Another technical task of the present invention is to provide a head mounted display and controlling method thereof, which can implement a more natural VR screen by outputting a VR screen suitable for orientation of the head mounted display if a frame output of a rendering computing device fails to be synchronized with an update period of a screen (e.g., a case that a refresh rate of a screen and a frame rate of a movie content are 90 Hz and 30 Hz, respectively).

Another technical task of the present invention is to provide a head mounted display and controlling method thereof, which can improve user convenience by displaying a message box stably and clearly if receiving an incoming call message from an external device while a user is watching a VR screen.

Another technical task of the present invention is to provide a head mounted display and controlling method thereof, which can implement a more natural VR screen by compressing frame data in a computing device, reducing a frame transmission time to a head mounted display, and reducing an amount of transmission data in a manner of making a delay time (motion to photon latency) independent from a transmission time by performing a rendering in the computing device only and a time warping and distortion in the head mounted display.

Further technical task of the present invention is to provide a head mounted display and controlling method thereof, which can reduce an unnecessary space by replacing heavily-wired VR head mounted displays by wireless without being affected by a delay process occurring in a data transmitting process unlike the related art in the course of transmitting data from the computing device to the headed mounted display.

Technical Solutions

In one technical aspect of the present invention, provided herein is a method of controlling a head mounted display, including connecting communication with a computing device, sensing a motion of the head mounted display at a first timing point, sending a first sensing information sensed at the first timing point to the computing device, receiving a frame rendered based on the first sensing information from the computing device, sensing a motion of the head mounted display at a second timing point, time-warping the received frame based on a second sensing information sensed at the second timing point, processing the time-warped frame based on the second sensing information, and displaying the processed frame on a screen.

In another technical aspect of the present invention, provided herein is a head mounted display, including a communication module transceiving data with a computing device, a sensor module sensing a motion of the head mounted display, a controller configured to send a first sensing information to the computing device, receive a frame rendered from the computing device, time-warp the received frame based on a second sensing information, process the time-warped frame based on the second sensing information, and display the processed frame, and a display module displaying the processed frame on a screen in response to a control command from the controller.

Advantageous Effects

According to one embodiment of the present invention, a more natural VR screen can be implemented by reducing a delay time in a manner of receiving a rendered frame based on first sensing information from a computing device and time-warping and distorting the frame based on second sensing information.

According to another embodiment of the present invention, a more natural VR screen can be implemented by outputting a VR screen suitable for orientation of the head mounted display if a frame output of a rendering computing device fails to be synchronized with an update period of a screen (e.g., a case that a refresh rate of a screen and a frame rate of a movie content are 90 Hz and 30 Hz, respectively).

According to another embodiment of the present invention, user convenience can be improved by displaying a message box stably and clearly if receiving an incoming call message from an external device while a user is watching a VR screen.

According to further embodiment of the present invention, a more natural VR screen can be implemented by compressing frame data in a computing device, reducing a frame transmission time to a head mounted display, and reducing an amount of transmission data in a manner of making a delay time (motion to photon latency) independent from a transmission time by performing a rendering in the computing device only and a time warping and distortion in the head mounted display.

According to another further embodiment of the present invention, an unnecessary space can be reduced by replacing heavily-wired VR head mounted displays by wireless without being affected by a delay process occurring in a data transmitting process unlike the related art in the course of transmitting data from the computing device to the headed mounted display.

DESCRIPTION OF DRAWINGS

FIG. 7 is a diagram showing a process in case of sensing a head mounted display at a first timing point and a second timing point according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Figure 1:
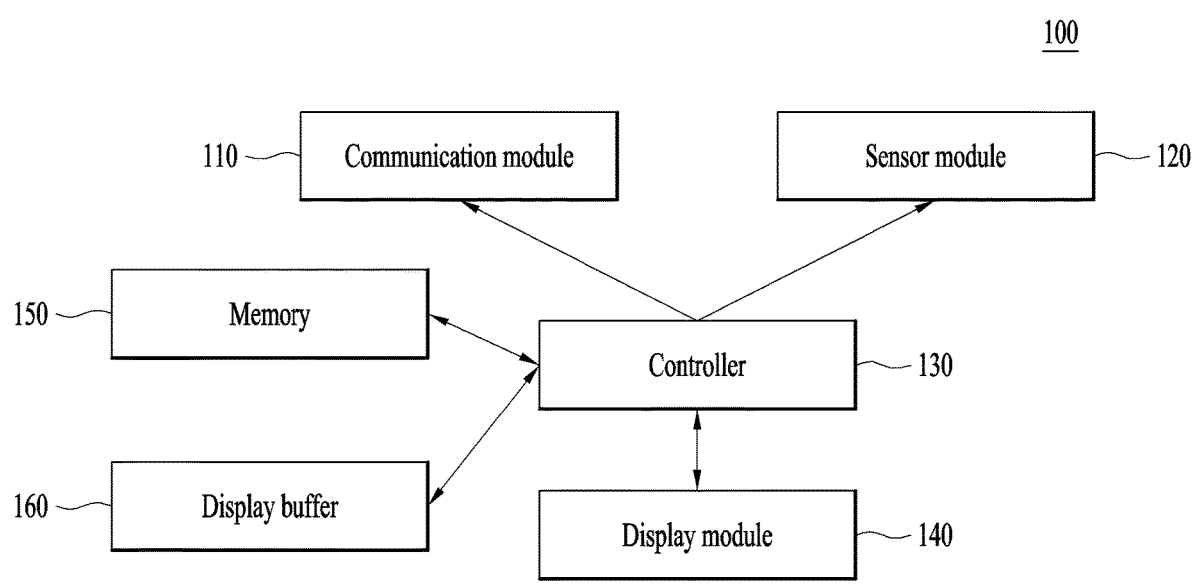
FIG. 1 is a schematic diagram of configuration of a head mounted display according to one embodiment of the present invention.

FIG. 1 is a schematic diagram of configuration of a head mounted display according to one embodiment of the present invention.

Referring to FIG. 1, a head mounted display 100 includes a communication module 110, a sensor module 120, a controller 130, a display module 140, a memory 150, and a display buffer 160.

The communication module 100 transceives data with a computing device 200. The communication module 100 includes a wireless communication unit. Its details shall be described with reference to FIG. 9.

The sensor module 120 senses a motion of the head mounted display 100.

The sensor module 120 includes sensors for generating motion, position and orientation data. The sensor module 120 includes a gyroscope, an acceleration sensor, a magnetic sensor, at least one video camera and color sensor and also includes a motion sensor, a position sensor, and orientation sensors.

The sensor module 120 may be operational on a relatively high frequency band to provide sensor data at a high rate.

For instance, the sensor data may be generated at the rate of 1,000 Hz. Or, the sensor module may perform sensing each 1 over million second. By such a method, several thousands of sensor data can be generated per second.

The sensor module 120 includes an IMU sensor module. Its details shall be described with reference to FIG. 8.

The controller 130 sends a first sensing information to the computing device 200, receives a rendered frame from the computing device 200, time-warps the received frame based on a second sensing information, processes the time-warped frame based on the second sensing information, and displays the processed frame.

The rendered frame is the frame of which at least one of a shadow, color and density of an image included in a frame is changed by the computing device 200.

Herein, rendering is to change at least one of a shadow, color and density of an image included in a frame.

Particularly, the rendering means a process for creating a video from a model (or, a scene file of collecting them) using a computer program. In a single scene file, there are entities configured with a defined language or material structure. Herein, arrangement of a figure representing a virtual scene, timing point, texture mapping, illumination, and shading information are included. Materials included in a scene file are the result from performing the rendering and create a digital image and a raster graphics image file. The rendering scheme creates a 2-dimensional (2D) picture from a 3-dimensional (3D) direction stored in a scene file according to a graphics pipeline through a rendering device such as a graphic processing unit (GPU).

Herein, a frame means a single picture of each image for displaying a motion of a scene contiguously when a video is played in video frame.

The controller 130 performs distortion on a frame to fit an optical structure of a lens.

Herein, the distortion means a distortion effect of a wide angle lens and indicates that an image is distorted due to an extremely exaggerated perspective of an image.

If at least one event occurs, the controller 130 receives at least two frame layers including a first frame layer and a second frame layer from the computing device 200 through the communication module 110, time-warps the first frame layer among the received at least two frame layers only, disposes the second frame layer on the first frame layer, and distorts the disposed first and second frame layers.

Herein, the second frame layer relates to the event. An image of the first frame layer is changed according to a motion of the head mounted display 100 and an image of the second frame layer is independent from the motion of the head mounted display 100.

Its details shall be described with reference to FIG. 10 and FIG. 11.

The controller 130 receives the rendered frame from the computing device 200 and time-warps the received frame based on the second sensing information.

Herein, 'time warp' means to create a frame corresponding to orientation based on the orientation in the second sensing information and the received frame.

Herein, the orientation means a direction vector in a 3D space in which a user wearing the head mounted display 100 views a thing.

The second timing point corresponds to a time after the first timing point and a time interval between the first timing point and the second timing point may be stationary or changeable.

The controller 130 simultaneously performs time warp and distortion on the received frame based on the second sensing information.

For instance, logically, after a time warp process has been executed, a distortion process is executed. Yet, in mathematical aspect, if the time warp process and the distortion process are regarded as 'multiply by 2' and 'multiply by 3', respectively, when the 'multiply by 2' and the 'multiply by 3' are combined together, it results in 'multiply by 6'.

In such case, if the 'multiply by 6' is executed as a single process from the beginning, i.e., if the time warp process and the distortion process are simultaneously executed, the result of the 'multiply by 6' is obtained. Hence, it brings the same effect of executing the time warp process and then executing the distortion process.

Hence, the case of executing the time warp process and the distortion process in order and the case of executing the time warp process and the distortion process simultaneously may bring the same effect.

The controller 130 includes a first GPU 132 and a second GPU 134.

GPU is a graphic processing unit and means a high-performance processing device for graphic processing.

The first GPU 132 time-warps the received frame based on the second sensing information and the second GPU 134 distorts the time-warped frame based on the second sensing information.

Its details shall be described with reference to FIG. 8.

The display module 140 displays the processed frame on a screen according to a control command from the controller 130.

At least one display module 140 may be provided. For instance, the display module 140 may be located right in front of both eyes of a user currently wearing the head mounted display. In this case, it is advantageous in displaying a frame on a screen using resolution relative smaller than that of displaying a frame on a screen for a user using a single display module 140.

The memory 150 stores the rendered frame.

The display buffer 160 stores image data of a frame right before the display module 140 displays the frame on the screen. And, the display buffer 160 may include the memory 150.

By the above scheme, the controller 130 displays the frame stored in the display buffer 160 on the screen, thereby being able to operate instantly in response to an input from the controller 130.

According to one embodiment of the present invention, the controller 130 corrects a distance from an object included in a frame displayed on the screen by interworking with a tracking module (not shown).

The tracking module (not shown) includes a camera module and its location is fixed. Herein, the camera module captures an object fixed to a nearby location like a wall, thereby providing the controller 130 with a fixed location information that can become a reference for location determination. The tracking module (not shown) may provide location information to the controller 130 by communicating with an external device such as a satellite.

For instance, the controller 130 receives location information from the tracking module (not shown) including the camera module and then corrects a distance from an object included in the frame based on the received location information.

For instance, if a user wearing the head mounted display 100 moves forward, the controller 130 regards a distance of the object included in the frame as 30 cm and then displays it on a screen. A real distance may become 25 cm and a direction may be further rotated at 30 degrees clockwise than a reference direction. Hence, an error distance of 5 cm and an error angle of 30 degrees may be generated.

The controller 130 corrects 30 cm into 25 cm based on the location information received from the tracking module (not shown) and also adjusts the error angle of 30 degrees by adjusting the direction into a counterclockwise direction.

Figure 2:
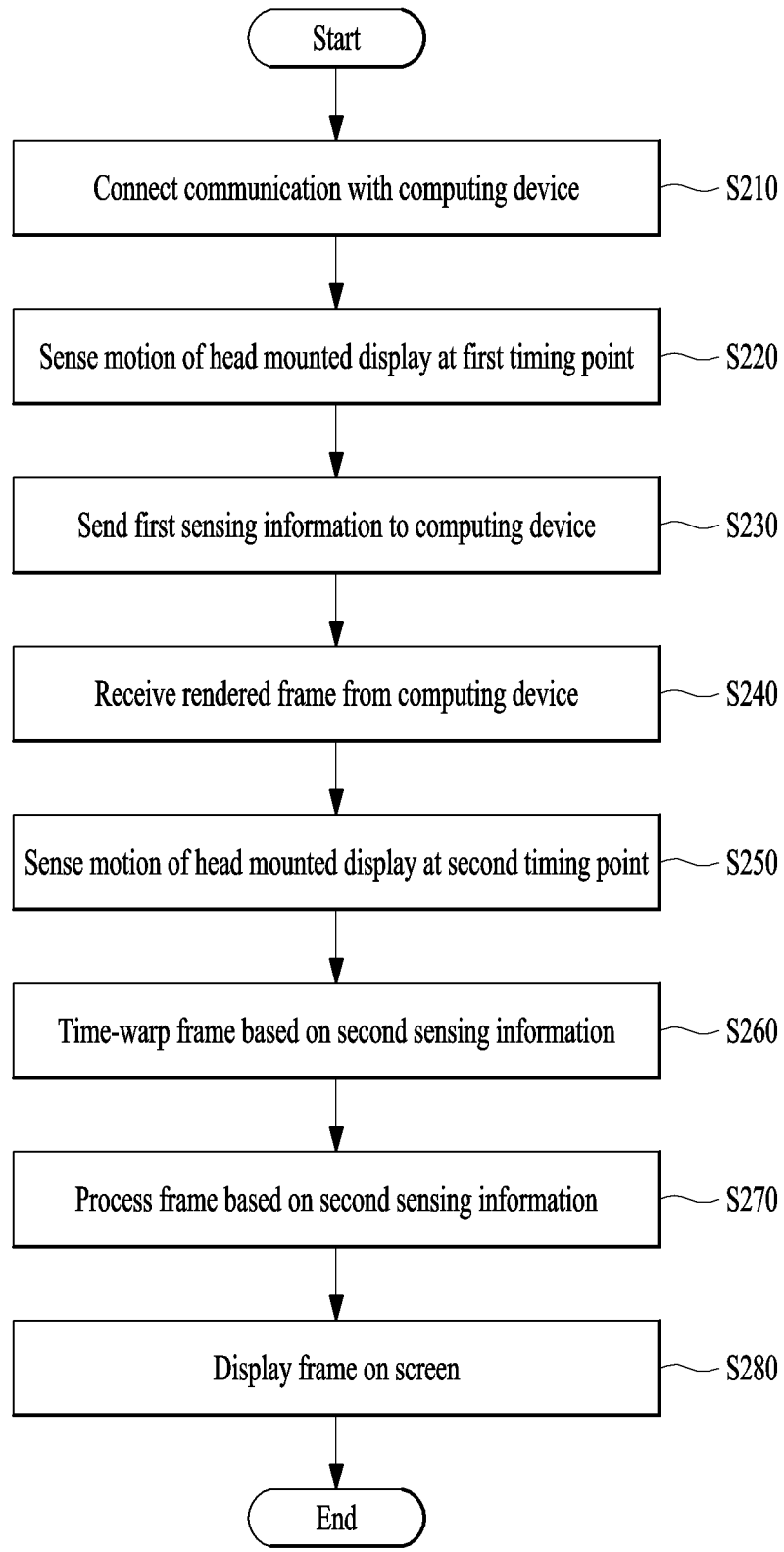
FIG. 2 is a flowchart of a method of controlling a head mounted display according to one embodiment of the present invention.

FIG. 2 is a flowchart of a method of controlling a head mounted display according to one embodiment of the present invention. The present invention is performed by the controller 130.

Referring to FIG. 2, first of all, a communication is connected to a computing device [S210].

Secondly, a motion of the head mounted display 100 is sensed at a first timing point [S220].

A first sensing information sensed at the first timing point is sent to the computing device 200 [S230].

A rendered frame is received from the computing device 200 based on the first sensing information [S240].

A motion of the head mounted display 100 is sensed at a second timing point [S250].

Herein, the second timing point is behind the first timing point and a time interval between the first and second timing points may be fixed or changeable.

The received frame is time-warped based on a second sensing information sensed at the second timing point [S260].

Particularly, the controller 630 generates a frame corresponding to orientation based on the orientation in a second sensing information and the received frame.

Based on the second sensing information, the time-warped frame is processes [S270].

Particularly, the controller 130 distorts the frame to fit the optical structure of the lens. Herein, the lens includes HMD lens.

The processed frame is displayed on the screen [S280].

Figure 3:
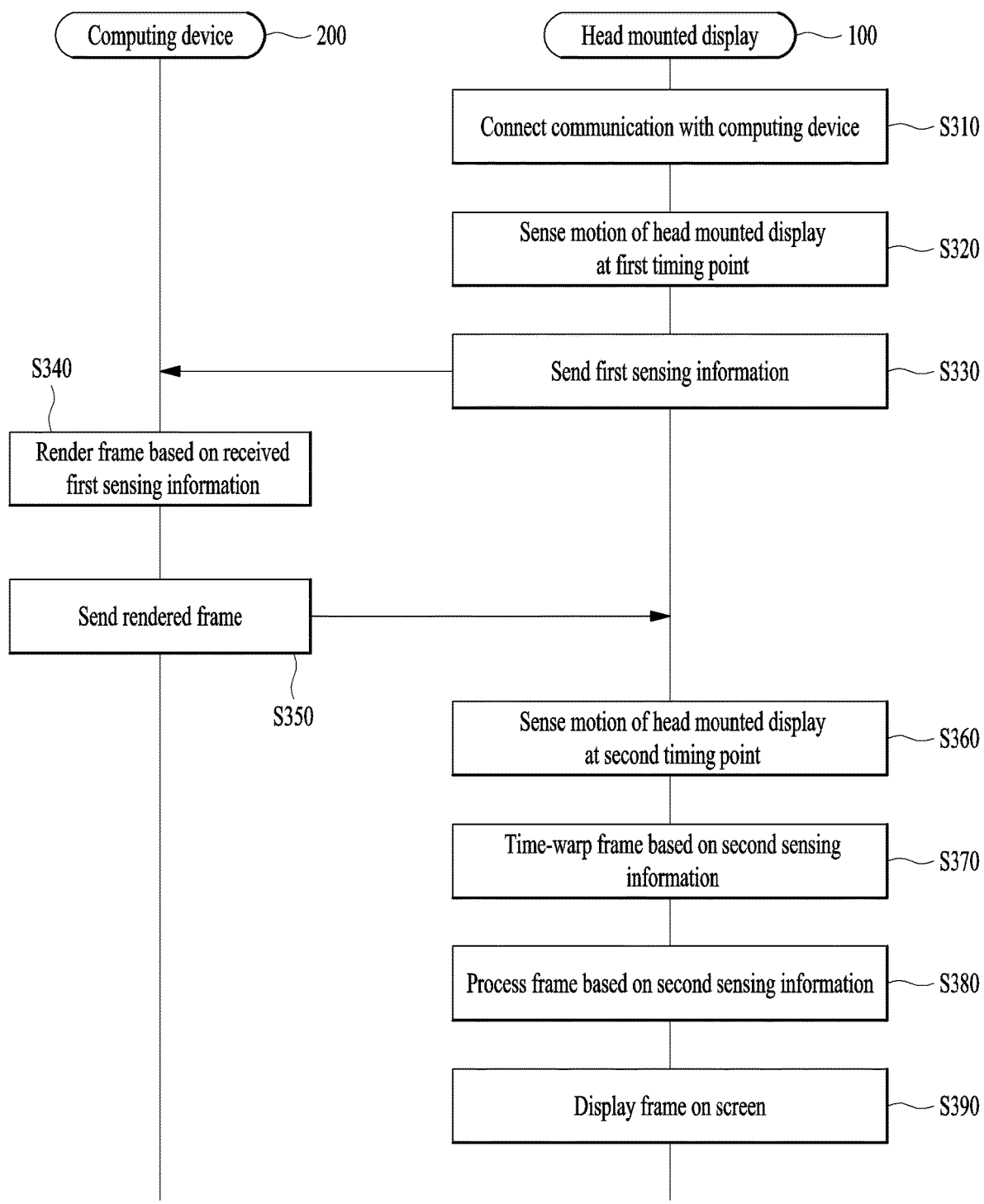
FIG. 3 is a diagram showing a data transmission and process between a mobile device and a head mounted display according to one embodiment of the present invention.

FIG. 3 is a diagram showing a data transmission and process between a mobile device and a head mounted display according to one embodiment of the present invention.

Referring to FIG. 3, first of all, a communication is connected to a computing device 200 [S310].

Secondly, a motion of the head mounted display 100 is sensed at a first timing point [S320].

A first sensing information sensed at the first timing point is sent to the computing device 200 [S330].

The computing device 200 renders a frame based on the received first sensing information [S340].

The computing device 200 sends the rendered frame to the head mounted display 100 [S350].

The head mounted display 100 senses a motion of the head mounted display 100 at a second timing point [S360].

The head mounted display 100 time-warps the received frame based on a second sensing information sensed at the second timing point [S370].

Based on the second sensing information, the head mounted display 100 processes the time-warped frame [S380].

The head mounted display 100 displays the processed frame on the screen [S390].

Figure 4:
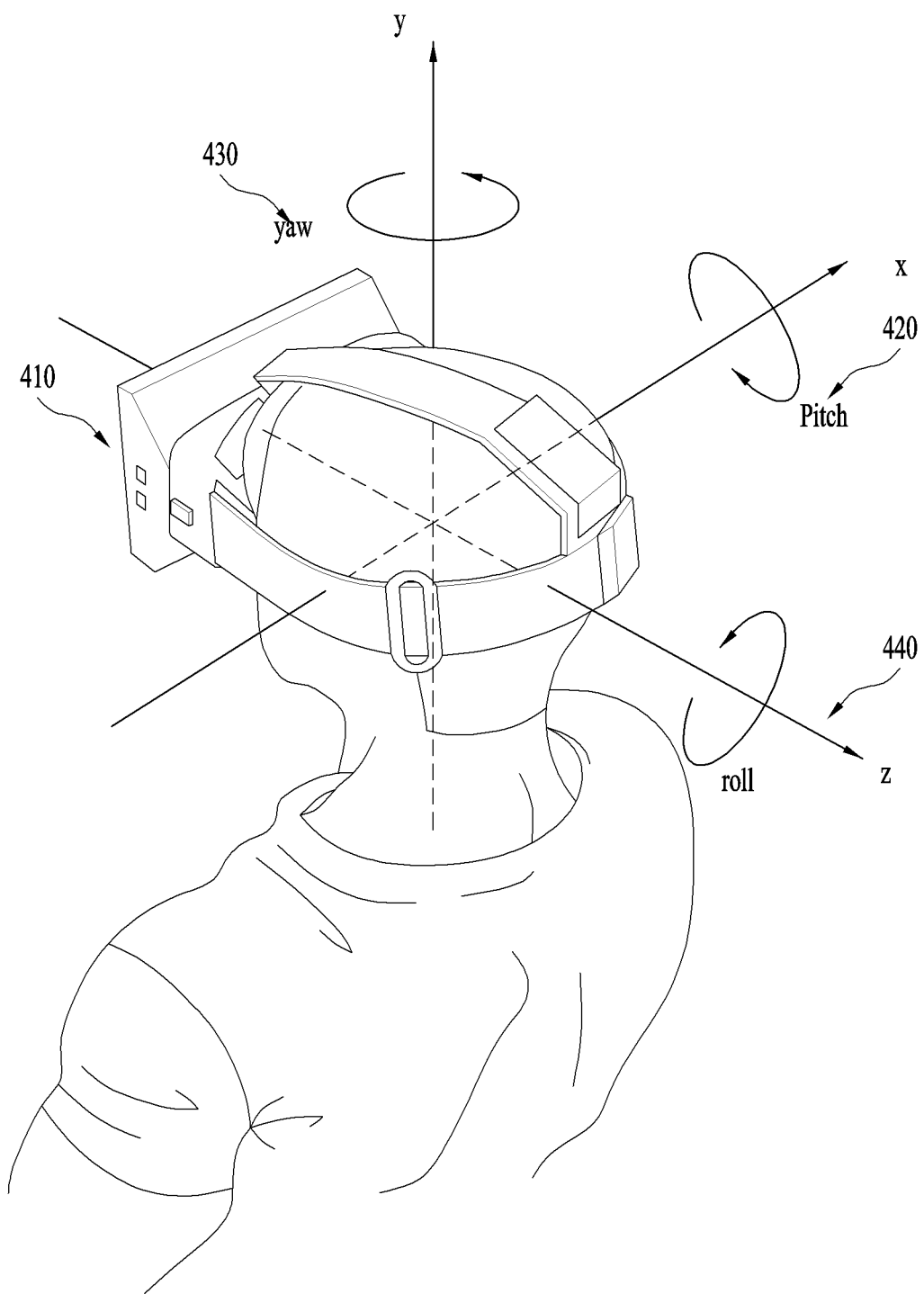
FIG. 4 is a diagram showing that a user wears a head mounted display according to one embodiment of the present invention.

FIG. 4 is a diagram showing that a user wears a head mounted display according to one embodiment of the present invention.

A head mounted display 410 is worn over user's eyes.

A center of user's head is located at a 3D center of axes of a pitch 420, a yaw 430 and a roll 440. In the 3D coordinate system, the pitch 420 is an x-axis rotation, the yaw 430 is a y-axis rotation, and the roll 400 is a z-axis rotation.

A motion of the head mounted display 410 worn by the user may be represented as the pitch 420, the yaw 430 and the roll 440.

One of 3D orientation representing methods is a method of using quaternion. This is because 3D orientation can be represented by quaternion as follows. $q(v, a)=(\cos(a/2), v\_x \sin(a/2), v\_y \sin(a/2), v\_z \sin(a/2))$, where $q(v, a)$ represents the same rotation.

In case of performing an operation for a rotation using quaternion, it is advantageous in using relatively small parameters. And, using the quaternion is very useful in performing prediction in 3D space for geometry operation together with Haar method.

Herein, the quaternion is an extension of conjugate numbers, which is devised by William Hamilton, and a sort of vector. The four fundamental arithmetic operations of quaternion is possible but commutative law is not valid. A quaternion is represented as $v=a+b\ i+c\ j+d\ k$ (where, a, b, c, d are real numbers) for three numbers i, j and k (where, $i^2=j^2=k^2-1$).

Figure 5:
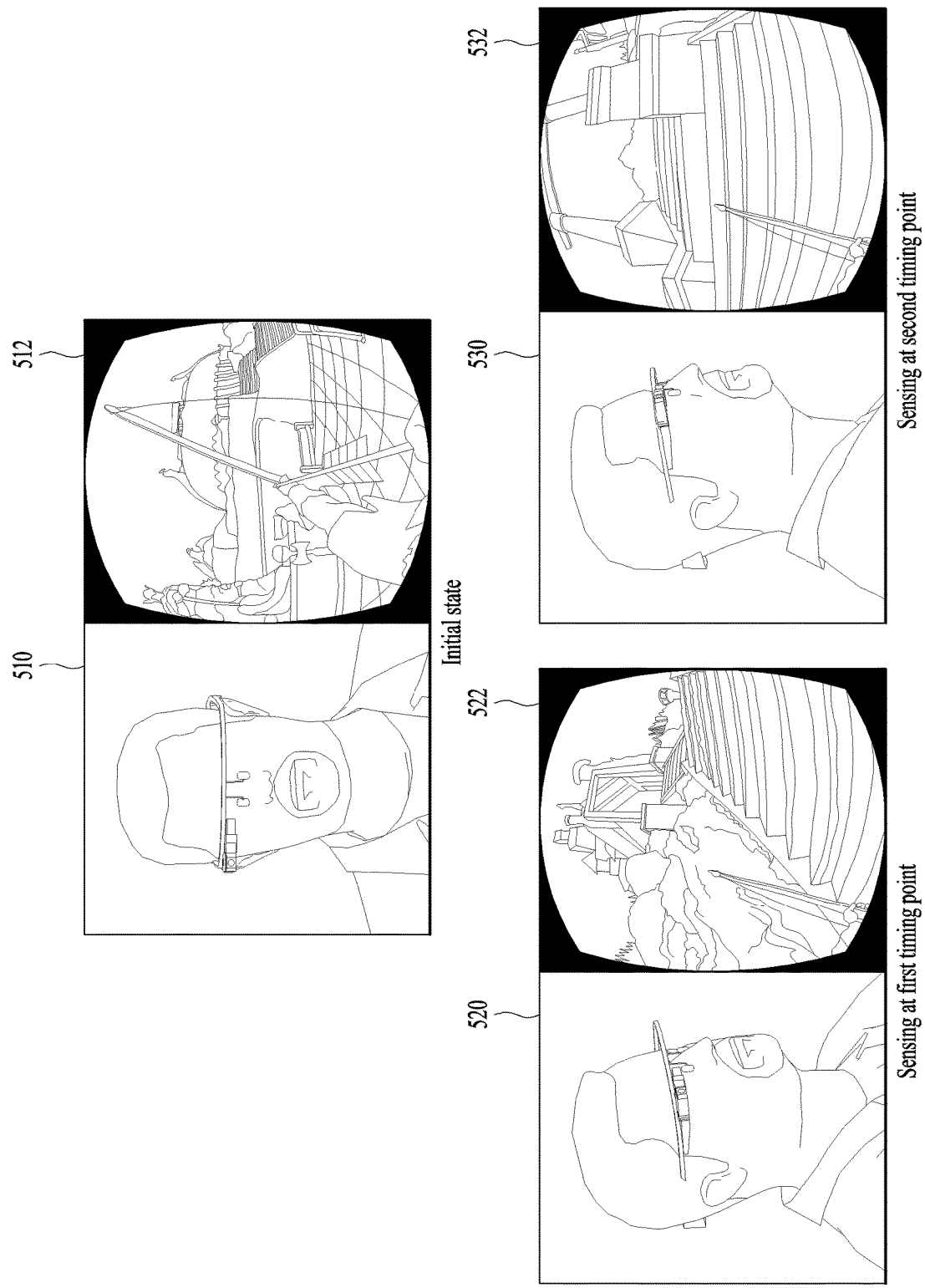
FIG. 5 is a diagram showing that a VR screen is implemented in response to user's motion, when a head mounted display is sensed at a first timing point and a second timing point, while a user wears the head mounted display according to one embodiment of the present invention.

FIG. 5 is a diagram showing that a VR screen is implemented in response to user's motion, when a head mounted display is sensed at a first timing point and a second timing point, while a user wears the head mounted display according to one embodiment of the present invention.

Like a diagram 510, in an initial state, a user wearing a head mounted display stares in a specific direction. This timing point becomes a reference timing point and an angle becomes 0°.

Like a diagram 512, in the initial state, the display module 140 displays a VR screen in the specific direction.

Like a diagram 520, a timing point, at which the user wearing the head mounted display 100 rotates his head at a first specific angle from the reference timing point, becomes a first timing point and the sensor module 120 senses a motion of the user at the first timing point.

Like a diagram 522, the display module 140 displays a VR screen in a direction rotated at the first specific angle in the specific direction.

Like a diagram 530, a timing point, at which the user wearing the head mounted display 100 rotates his head at a second specific angle from the reference timing point, becomes a second timing point and the sensor module 120 senses a motion of the user at the second timing point.

Like a diagram 532, the display module 140 displays a VR screen in a direction rotated at the second specific angle in the specific direction.

Figure 6:
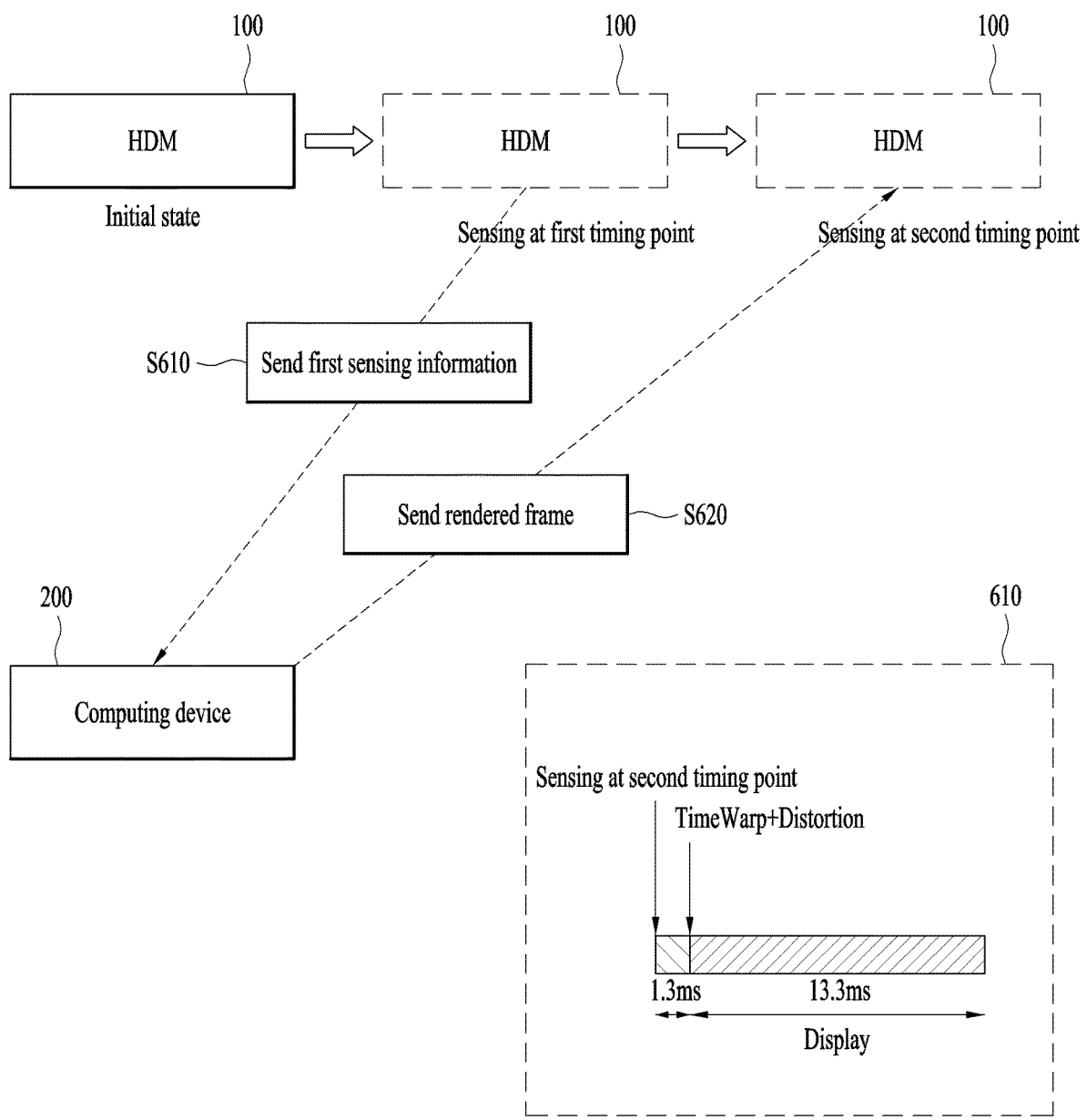
FIG. 6 is a diagram showing a data transmission between a head mounted display and a device by sensing the head mounted display at a first timing point and a second timing point and a diagram of a process after the sensing at the second timing point according to one embodiment of the present invention.

FIG. 6 is a diagram showing a data transmission between a head mounted display 100 and a computing device 200 by sensing the head mounted display at a first timing point and a second timing point and a diagram of a process after the sensing at the second timing point according to one embodiment of the present invention.

Referring to FIG. 6, the head mounted display 100 is in an initial state.

The head mounted display 100 performs a sensing at a first timing point and sends a first sensing information to the computing device 200 [S610].

The computing device renders a frame based on a first sensing information and then sends the rendered frame to the head mounted display 100 [S620].

The head mounted display 100 performs a sensing at a second timing point and processes the rendered fame based on a second sensing information.

Like the drawing 610, looking into a process after the sensing at the second timing point, the head mounted display 100 performs the sensing at the second timing point, time-warps the rendered frame based on the second sensing information, and distorts the time-warped frame.

The head mounted display 100 displays the distorted frame on the screen.

In this case, a process progress time after the sensing at the second timing point corresponds to t=1.3+13.3/2=7.95 ms.

Herein, t is measured with reference to the second timing point, a frame is time-warped, a time taken for distorting the time-warped frame is 1.3 ms, and a time taken for displaying the frame on the screen is 6.65 ms.

According to one embodiment of the present invention, when the rendered frame is sent to the head mounted display 100 from the computing device 200, in case that it is sent at fps slower than the head mounted display 100 or that a frame transmission rate is lowered, the head mounted display 100 can time-warp an image stored in the memory irrespective of such a case.

Herein, the fps (frame per second) means the number of frames processed by a GPU per second. A frame rate is represented as a frame frequency, indicates a frequency for rendering an image (frame), and is generally measured by fps unit. In aspect of QoS (quality of service), if a frame rate is high, it can secure a high quality.

For instance, even if the computing device 200 outputs at 15 fps because GPU performance of the computing device 200 for rendering is lower than that of the head mounted display 100, the head mounted display 100 saves a received frame to the memory 150 and displays the saved frame to fit a refresh rate of 30 fps based on orientation information sensed continuously.

If the display module 140 does not use a fixed refresh rate, orientation information is directly sensed at the timing point capable of displaying a next frame, the frame is time-warped based on sensing information, the frame is distorted based on the sensing information, and the distorted frame is displayed.

For instance, when a specific game is run, a frame rendering may differ per frame section. A frame rendering may be 70 fps in a first section and a frame rendering may become 120 fps in a second section different from the first section.

Right after finishing the rendering, if the computing device 200 sends the rendered frame to the head mounted display 100, the controller 130 displays the frame sent by the computing device on the screen intactly without displaying the frame to fit a specific frequency supported for the display module 140.

FIG. 7 is a diagram showing a process in case of sensing a head mounted display at a first timing point and a second timing point according to one embodiment of the present invention.

Like a diagram 710, according to a related art 1, the head mounted display 100 performs a sensing at a first timing point and sends a first sensing information to the computing device 200. The computing device 200 renders a frame based on the first sensing information, distorts the rendered frame, temporarily stands by before transmission for video synchronization, and sends the distorted frame to the head mounted display 100. The head mounted display 100 displays the received frame on the screen.

Herein, a time taken for displaying the frame on the screen results from dividing the time required for displaying a pixel on the screen from a start point to an end point by 2.

For instance, if the time required for displaying a pixel on the screen from a start point to an end point is 13.3 ms, the time taken for displaying the frame on the screen becomes 6.65 ms (=13.3/2).

This process identically applies to a related art 2 and the present invention.

The time required in the related art 1 becomes t1=13.3+12+13.3/2=31.95 ms.

Herein, a time taken for rendering a frame and standing by is 13.3 ms, a time taken for sending the frame from the computing device 200 to the head mounted display 100 is 12 ms, and a time taken for displaying the frame on the screen is 6.65 ms.

Like a diagram 720, in a related art 2, the head mounted display 100 performs sensing at a first timing point and a second timing point and sends a first sensing information and a second sensing information to the computing device 200. The computing device 200 renders a frame based on the first sensing information, time-warps the rendered frame based on the second sensing information, distorts the time-warped frame based on the second sensing information, temporarily stands by before transmission for video synchronization, and sends the distorted frame to the head mounted display 100. The head mounted display 100 displays the received frame on the screen.

The time required becomes t2=1.3+12+13.3/2=19.95 ms.

Herein, t2 is measured with reference to the second timing point, the frame is time-warped, a time taken for distorting the time-warped frame is 1.3 ms, a time taken for sending the frame from the computing device 200 to the head mounted display 100 is 12 ms, and a time taken for displaying the frame on the screen is 6.65 ms.

In the related art 2, as the computing device 200 renders a frame and then performs a process for temporarily standing by before sending the rendered frame for time warp, distortion and video synchronization, a data size increases. Hence, it is highly probable that a transmission time exceeds 12 ms.

Like a diagram 730, according to the present invention, the head mounted display 100 performs a sensing at a first timing point 732 and sends a first sensing information to the computing device 200. The computing device 200 renders a frame based on the first sensing information and sends the rendered frame to the head mounted display. The head mounted display 100 performs a sensing at a second timing point 734, time-warps the rendered frame based on orientation information in the sensed second sensing information, distorts the frame, and displays the distorted frame on the screen.

The time required becomes t3=1.3+13.3/2=7.95 ms.

Herein, t3 is measured with reference to the second timing point, the frame is time-warped, a time taken for distorting the time-warped frame is 1.3 ms, and a time taken for displaying the frame on the screen is 6.65 ms.

Since the related art 1 renders the frame based on the first sensing information sensed at the first timing point only and fails to reflect the second timing point at which a user moves his head, if the frame is displayed on the screen, the user feels dizzy.

According to the related art 2, the computing device 200 renders a frame based on the first sensing information, time-warps the rendered frame based on the second sensing information, and distorts the corresponding frame, thereby reflecting the second timing point at which a user moves his head. Yet, since a size of data quantity is bigger than that of the present invention, there is a problem of taking a long transmission time. Moreover, in case of sending the frame to the head mounted display 100 from the computing device 200 using wireless communication, a delay time is extended.

According to the present invention, in comparison with the related art 1, the head mounted display 100 time-warps a rendered frame based on a second sensing information sensed in the course of or after transmission and distorts the time-warped frame, whereby a delay time can be reduced.

According to the present invention, in comparison with the related art 1 or 2, after a rendered frame has been sent to a head mounted display from a computing device, a time warp is performed. Although VR head mounted displays with lots of lines are replaced by wireless, there is no effect of a delay time due to wireless. Hence, a delay time can be reduced.

Figure 8:
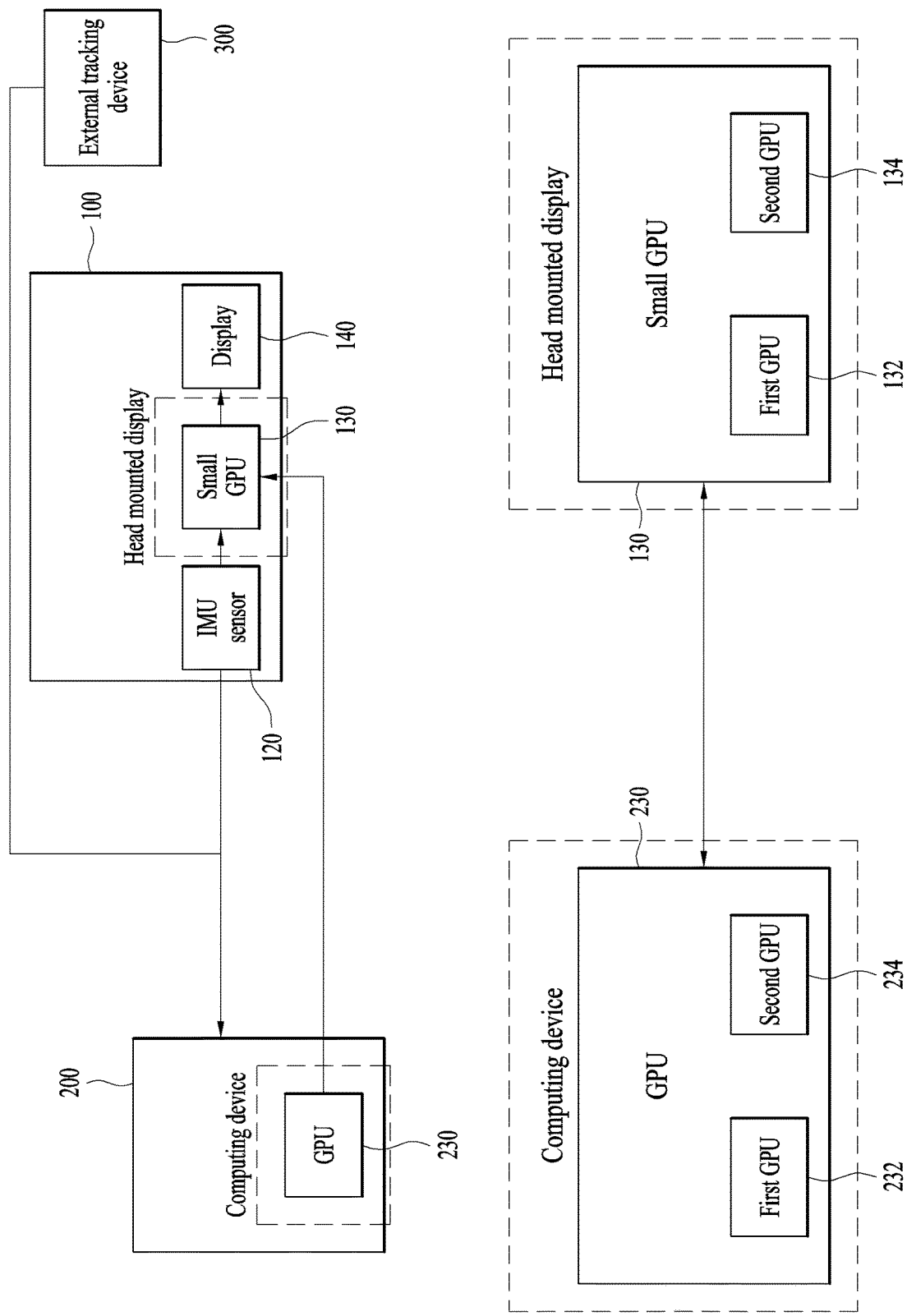
FIG. 8 is a diagram showing a case that a plurality of GPUs such as a first GPU and a second GPU are included in the hardware configuration according to one embodiment of the present invention.

FIG. 8 is a diagram showing a case that a plurality of GPUs such as a first GPU and a second GPU are included in the hardware configuration according to one embodiment of the present invention.

The head mounted display 100 of the present invention includes an IMU sensor module 120, a small GPU 130 and a display module 140.

The IMU sensor module 120 senses a moving direction, current pose, current location and the like of an object by measuring an inertia amount of the moving object.

The controller 130 includes a first GPU 132 and a second GPU 134. Herein, the controller 130 includes a small GPU. The small GPU time-warps a frame and distorts the frame.

The first GPU 132 time-warps a received frame based on a second sensing information and the second GPU 134 distorts the time-warped frame based on the second sensing information.

Hence, according to the present invention, the frame time warp and the distortion are performed by separate GPUs, respectively, whereby the processing speed can be raised.

Moreover, the controller 130 can control the time warp and distortion process to be executed in a display driver chip (display driver IC, DDI). Herein, the DDI is a semiconductor chip configured to adjust pixels in the middle so that the substance memorized by a memory semiconductor in a device like a liquid crystal display (LCD) can appear on a screen.

The computing device 200 includes a GPU 230. The GPU 230 performs frame rendering.

The GPU 230 includes a first GPU 232 and a second GPU 234.

For instance, a specific one of the first GPU 232 and the second GPU 234 renders a frame for a sight viewed through, user's left eye and the other renders a frame for a sight viewed through user's right eye.

The specific one of the first GPU 232 and the second GPU 234 creates a frame of a 3D screen of a single stereo type by combining the rendered frames together.

Therefore, according to one embodiment of the present invention, a computing device uses a plurality of GPUs, thereby improving a frame rate in a manner of assigning specific jobs to a plurality of the GPUs on running a virtual reality application, respectively. Moreover, GPU use settings are optimized to fit high-performance VR rendering and a user can be provided with a more natural and smooth screen through a high frame rate.

Moreover, according to one embodiment of the present invention, the computing device 200 performs rendering only and the head mounted display 100 performs time warping and distortion, whereby a transmission time from the computing device 200 to the head mounted display 100 can be reduced. Therefore, a more natural VR screen can be implemented.

The external tracking device 300 may be used for correction of a distance from an object included in a frame displayed on a screen by being linked to the controller 130 of the head mounted display 100.

The external tracking device 300 includes a camera module and its location is fixed. Herein, the camera module provides fixed location information to the controller 130 by providing its current location information to the controller 130 or capturing an object fixed to a nearby spot such as a wall.

For instance, the controller 130 receives location information from the external tracking device 300 including the camera module and corrects a distance of an object in a frame based on the received location information.

For instance, if a user wearing the head mounted display 100 moves forward, the controller 130 displays a frame on the screen by regarding a distance from an object included in the frame as 30 cm based on a value sensed by the sensor module 120. A real distance may be 25 cm and a direction may be further rotated at 30° clockwise than a reference direction. Hence, an error distance of 5 cm and an error angle of 30° may be generated.

The controller 130 corrects 30 cm into 25 cm based on the location information received from the tracking device 300 and rotates counterclockwise to correct the error angle of 30°.

Figure 9:
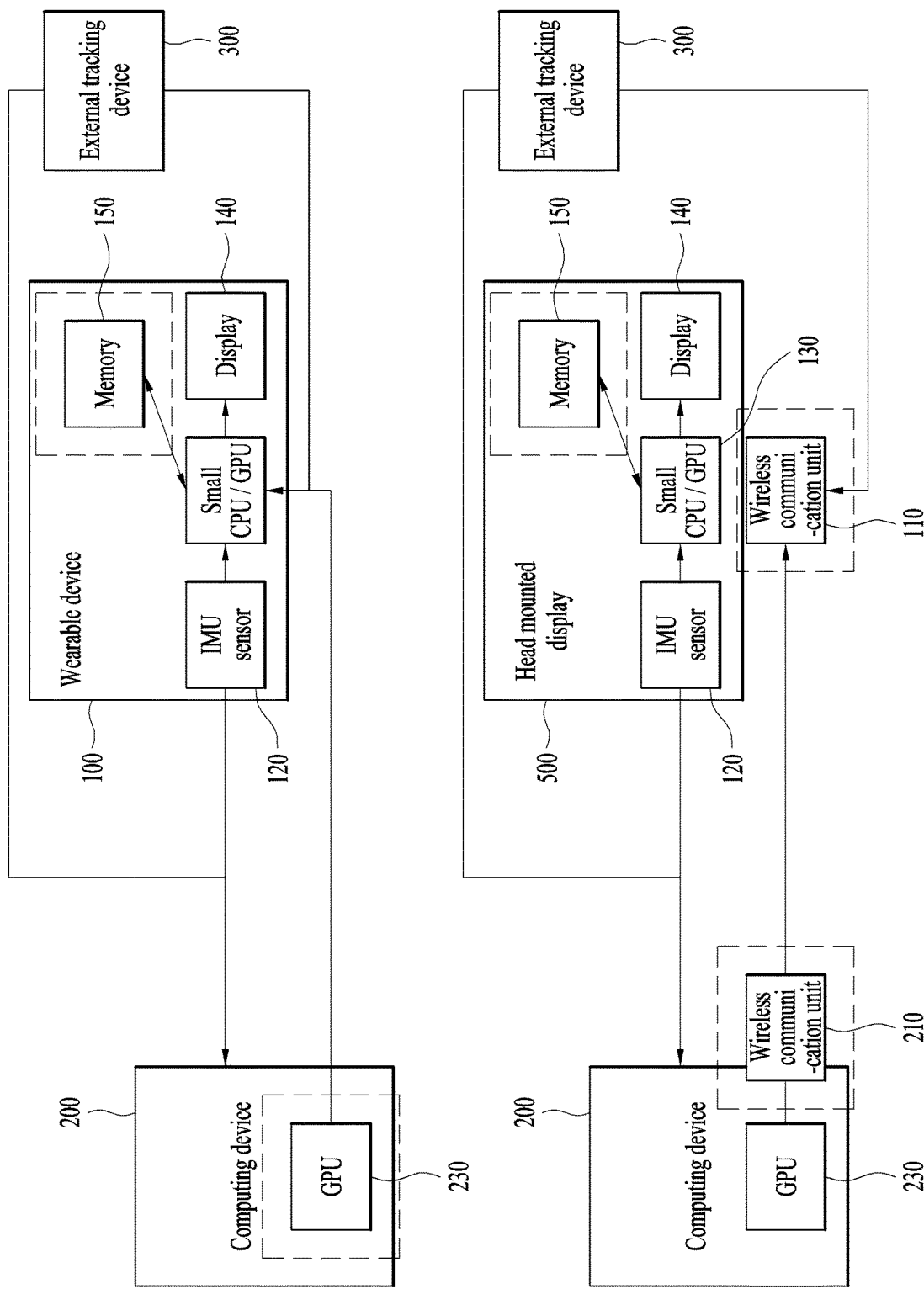
FIG. 9 is a diagram showing that a memory and a wireless communication unit are added to the hardware configuration according to one embodiment of the present invention.

FIG. 9 is a diagram showing that a memory and a wireless communication unit are added to the hardware configuration according to one embodiment of the present invention.

Like the present invention 2, the head mounted display 100 further includes the memory 150.

The memory 150 stores a rendered frame.

The controller 130 time-warps a frame stored in the memory 150 based on a second sensing information.

Like the present invention 3, the computing device 200 further includes a wireless communication unit 210 and the head mounted display 100 further includes a wireless communication unit 110.

The wireless communication unit 210 of the computing device 200 divides a frame into packets and then sends the packets to the wireless communication unit 110 of the head mounted display 100. The wireless communication unit 110 of the head mounted display 100 combines the received packets to reconstruct them into the frame.

Figure 10:
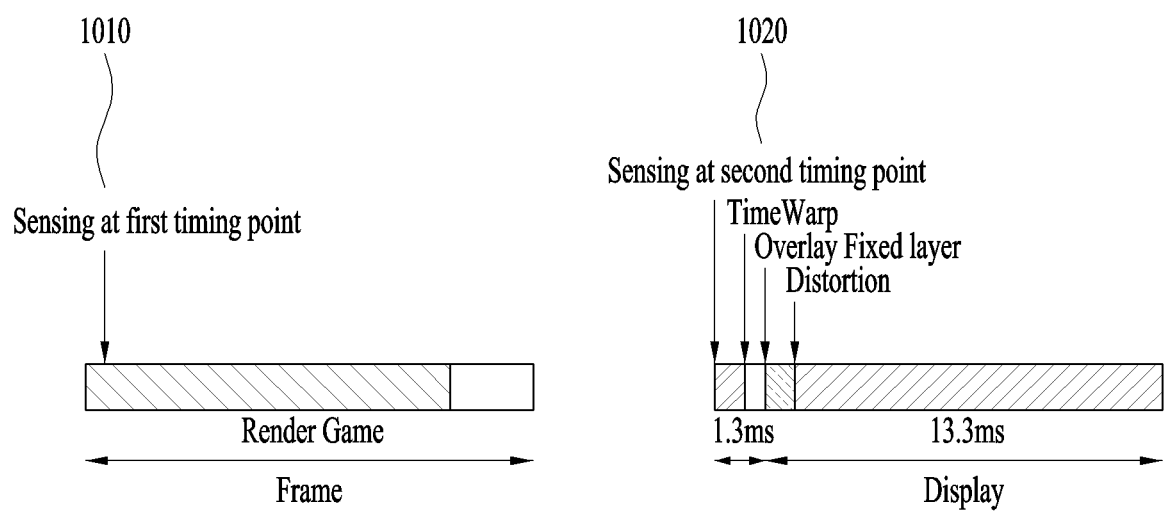
FIG. 10 is a diagram showing a process after sensing a head mounted display at a second timing point according to one embodiment of the present invention.

FIG. 10 is a diagram showing a process after sensing a head mounted display at a second timing point according to one embodiment of the present invention.

Like a diagram 1010, a first timing point is a timing point at which an event such as a phone call notification message reception, a user is located at a first point, and a second timing point like a diagram 1020 is a timing point at which a user moves eyes from the first point to a second point.

If such an event as a phone call notification message reception occurs, the controller 130 receives at least two frame layers including a first frame layer and a second frame layer from the computing device 200.

The controller 130 time-warps the first frame layer only when there are the first and second frame layers.

Herein, an image of the first frame layer is changed according to a motion of the head mounted display and an image of the second frame layer is independent from the motion of the head mounted display.

The controller 130 disposes the second frame layer over the first frame layer.

The controller 130 distorts the disposed first and second frame layers.

Namely, the controller 180 performs a sensing at the second timing point, time-warps the first frame layer only, disposes the non-time-warped second frame layer over the first frame layer, and then performs a distortion process.

According to one embodiment of the present invention, when two frame layers are sent to the head mounted display 100 from the computing device 200, the computing device 200 sends the second frame layer (non-time-warped frame layer) as meta data instead of an image.

The controller 130 reconstructs the second frame layer based on the received meta data. herein, the meta data includes an indicator indicating that it is a text and a text.

The controller 130 disposes the second frame layer over the first frame layer and distorts the disposed first and second frame layers.

According to the present invention, if receiving a text from an external device, two image frames are not sent to the head mounted display 100 but a single image frame and meta data are sent to the head mounted display 100, thereby reducing a transmission time and a data amount and also decreasing a memory use amount.

Figure 11:
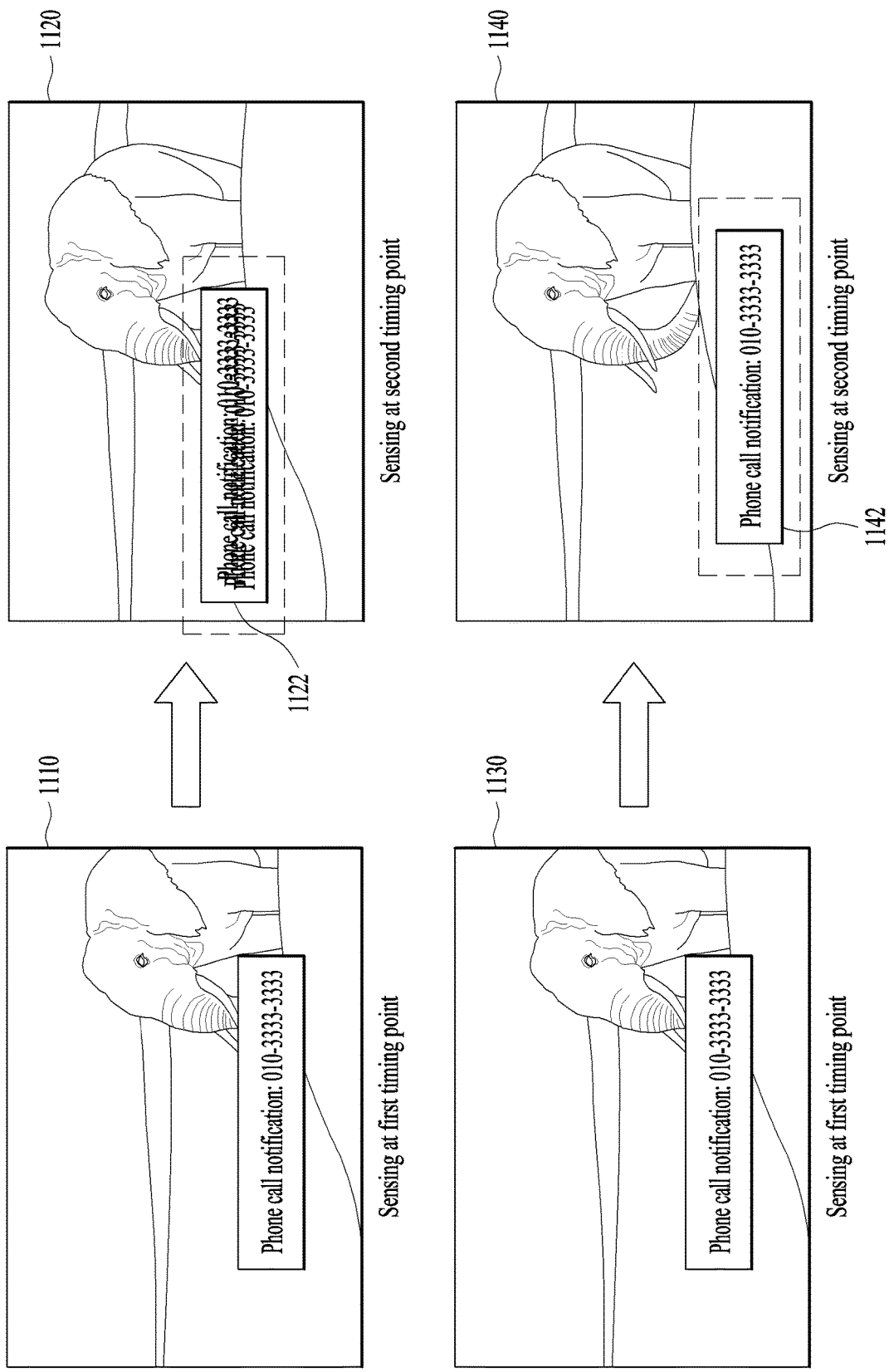
FIG. 11 is a diagram showing that a screen is implemented differently if an event occurs in the course of VR (virtual reality) implementation in the related art and the present invention according to one embodiment of the present invention.

FIG. 11 is a diagram showing that a screen is implemented differently if an event occurs in the course of VR (virtual reality) implementation in the related art and the present invention according to one embodiment of the present invention.

In case of performing a time warp, the sensor module 120 senses a motion of the head mounted display twice at a first timing point and a second timing point.

Particularly, the sensor module 120 senses a motion of the head mounted display 100 at the first timing point and sends a first sensing information to the computing device 200. The computing device 200 renders a frame based on the first sensing information and sends the rendered frame to the head mounted display 100.

In this case, since a frame corresponding to orientation is created based on orientation in a second sensing information and the rendered frame, if an event such as a message reception occurs in the middle, it may cause a problem that a received message is not displayed at a location desired by a user.

In particular, a text message, a phone call notification message and the like are not affected by a direction of user's eyes. If such a message is received, a message box looks trembling due to a difference between a first sensor information and a second sensor information. Hence, it may cause a problem that a user feels inconvenient.

According to the related art, like a diagram 1110, when a timing point is the first timing point, the user is watching a specific image and the specific image is located at a first point.

Like a diagram 1120, when a timing point is the second timing point, the specific image moves to the second point from the first point according to user eyes.

Herein, the first timing point is a timing point at which at least one event such as a phone call notification message reception occurs and the second timing point is a timing point at which user eyes are moved from the first point to the second point.

According to the present invention, like a diagram 1130, when a timing point is the first timing point, the user is watching a specific image and the specific image is located at the first point.

Like a diagram 1140, when a timing point is the second timing point, a specific image moves from the first point to the second point according to user eyes and a phone call notification event message box image is fixed.

Particularly, the controller 130 receives at least two frame layers including a first frame layer including a specific image and a second frame layer including a message box image through the communication module.

Herein, the layer means a layer used to display several images overlaid with each other. In particular, in case that several image have different motions, effects and the like in a single frame, the respective layers are made in a manner of being differentiated. In doing so, the respective images appear in a manner of overlaying each other one by one.

The controller 130 time-warps the first frame layer among the received at least two frame layers only and disposes the second frame layer over the first frame layer.

The controller 130 distorts the disposed first and second frame layers.

Herein, an image of the first frame layer including the specific image is changed according to a motion of the head mounted display and an image of the second frame layer including the message box image is independent from the motion of the head mounted display.

Namely, the controller 130 separates the image of the first frame layer changed according to user's eyes from the image of the second frame layer desired to be fixed irrespective of user's eyes.

Therefore, according to the present invention, by correcting an effect trembling due to the difference between the first sensor information and the second sensor information, which occurs due to the sensing timing points, the message box image trembling does not occur, whereby user convenience is enhanced.

Figure 12:
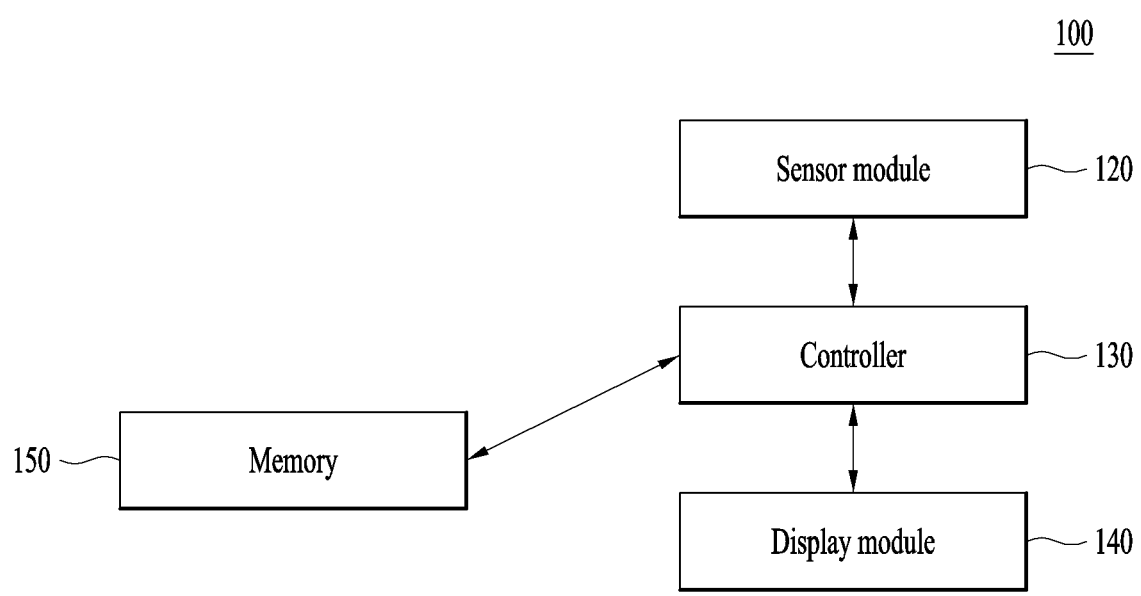
FIG. 12 is a diagram showing the configuration of a head mounted display having all processes run therein according to one embodiment of the present invention.

FIG. 12 is a diagram showing the configuration of a head mounted display having all processes run therein according to one embodiment of the present invention. And, FIG. 8 is a diagram showing configuration of a controller.

Referring to FIG. 12 and FIG. 8, the controller 130 includes the first GPU 132 and the second GPU 134.

The first GPU 132 renders a frame and saves the rendered frame to the memory 150. The second GPU 134 time-warps the rendered frame to fit a refresh rate of the display module 140 based on the second sensing information and distorts the time-warped frame.

Herein, the second GPU 134 includes a processing module separate from the first GPU 132 or a display driver IC.

Hence, a first process for the first GPU 132 to render the frame is desynchronized with a second process for the second GPU 134 to time-warp the rendered frame and distort the time-warped frame. Namely, the first process and the second process are executed in different time slots, respectively.

As the time slot for executing the first process is different from that for executing the second process, even if fps of the first process is lower than a preset value, it is able to prevent a user from feeling dizzy.

Particularly, if a frame reception speed is slower than a preset value in the first process, e.g., 10 fps, the second GPU 134 does not perform a sensing each time a frame is received. The second GPU 134 receives sensing information from the sensor module 120 to fir a refresh rate of the display module 140, time-warps the rendered frame based on the received sensing information, distorts the time-warped frame, and displays it on the screen.

According to the present invention, although a frame reception speed is slower than a preset value, the second GPU 134 generates a frame corresponding to orientation based on the orientation in the received sensing information and the received frame, thereby reducing dizziness felt by a user.

According to one embodiment of the present invention, a more natural VR screen can be implemented by reducing a delay time in a manner of receiving a rendered frame based on a first sensing information from a computing device and time-warping and distorting the frame based on a second sensing information.

According to another embodiment of the present invention, a more natural VR screen can be implemented by outputting a VR screen suitable for orientation of the head mounted display if a frame output of a rendering computing device fails to be synchronized with an update period of a screen (e.g., a case that a refresh rate of a screen and a frame rate of a movie content are 90 Hz and 30 Hz, respectively).

According to another embodiment of the present invention, user convenience can be improved by displaying a message box stably and clearly if receiving an incoming call message from an external device while a user is watching a VR screen.

According to further embodiment of the present invention, a more natural VR screen can be implemented by compressing frame data in a computing device, reducing a frame transmission time to a head mounted display, and reducing an amount of transmission data in a manner of making a delay time (motion to photon latency) independent from a transmission time by performing a rendering in the computing device only and a time warping and distortion in the head mounted display.

According to another further embodiment of the present invention, an unnecessary space can be reduced by replacing heavily-wired VR head mounted displays by wireless without being affected by a delay process occurring in a data transmitting process unlike the related art in the course of transmitting data from the computing device to the headed mounted display.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

MODE FOR INVENTION

Various embodiments are disclosed in BEST MODE FOR INVENTION for implementing the present invention.

INDUSTRIAL APPLICABILITY

The present invention is used for a series of virtual reality (VR) and head mounted display related fields.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a head mounted display, comprising:
   connecting communication with a computing device;
   sensing a first motion of the head mounted display at a first timing point;
   sending first sensing information sensed at the first timing point to the computing device;
   in response to at least one event occurring, receiving at least two frame layers including a non-time warped first frame layer rendered based on the first sensing information from the computing device and a non-time warped second frame layer corresponding to the at least one event from the computing device;
   sensing a second motion of the head mounted display at a second timing point;
   time-warping the non-time warped first frame layer based on second sensing information sensed at the second timing point to generate a time-warped first frame layer without time-warping the non-time warped second frame layer;
   disposing the non-time warped second frame layer over the time-warped first frame layer;
   distorting both the time-warped first frame layer and the non-time warped second frame layer to generate a distorted time-warped first frame layer and a distorted non-time warped second frame layer; and displaying the distorted time-warped first frame layer and the distorted non-time warped second frame layer together on a screen, wherein the time-warping includes changing an image of the first frame layer according to the second motion of the head mounted display at the second timing point, and wherein an image of the non-time warped second fame layer is independent from the second motion of the head mounted display.

2. The method of claim 1, wherein the distorting includes distorting the time-warped first frame layer and the non-time warped second frame layer to fit an optical structure of a lens.

3. The method of claim 1, wherein the rendering is for the computing device to change at least one of a shadow, color and density of an image included in a frame.

4. The method of claim 1, wherein the time-warping comprises generating a frame corresponding to orientation based on the orientation in the second sensing information and the non-time warped first frame layer.

5. The method of claim 1, wherein the second timing point is behind the first timing point and wherein a time interval between the first timing point and the second timing point is fixed or changeable.

6. The method of claim 1, wherein the distorted time-warped first frame layer includes information of a virtual reality scene, and the distorted non-time warped second frame layer includes notification information for the at least one event.

7. A head mounted display, comprising:
a display module configured to display a processed frame on a screen;
a communication module configured to transceive data with a computing device;
a sensor module configured to sense a motion of the head mounted display;
a controller configured to:
cause the sensor module to sense a first motion of the head mounted display at a first timing point,
send first sensing information sensed at the first timing point to the computing device,
in response to at least one event occurring, receive at least two frame layers including a non-time warped first frame layer rendered based on the first sensing information and a non-time warped second frame layer corresponding to the at least one event from the computing device via the communication module,
cause the sensor module to sense a second motion of the head mounted display at a second timing point,
time-warp the non-time warped first frame layer based on second sensing information sensed at the second timing point to generate a time-warped first frame layer without time-warping the non-time warped second frame layer;
dispose the non-time warped second frame layer over the time-warped first frame layer;
distort both the time-warped first frame layer and the non-time warped second frame layer to generate a distorted time-warped first frame layer and a distorted non-time warped second frame layer; and
display the distorted time-warped first frame layer and the distorted non-time warped second frame layer together on the screen,
wherein the time-warped first frame layer includes an image of the first frame layer changed according to the second motion of the head mounted display at the second timing point, and
wherein an image of the non-time warped second fame layer is independent from the second motion of the head mounted display.

8. The head mounted display of claim 7, wherein the distorted time-warped first frame layer and the distorted non-time warped second frame layer are distorted to fit an optical structure of a lens.

9. The head mounted display of claim 7, wherein the rendered non-time warped first frame layer means that at least one of a shadow, color and density of an image is changed by the computing device.

10. The head mounted display of claim 7, wherein the controller generates a frame corresponding to orientation based on the orientation in the second sensing information and the non-time warped first frame layer.

11. The head mounted display of claim 7, wherein the second timing point is behind the first timing point and wherein a time interval between the first timing point and the second timing point is fixed or changeable.

12. The head mounted display of claim 7, wherein the controller simultaneously time-warps and distorts the non-time warped first frame layer based on the second sensing information.

13. The head mounted display of claim 7, wherein the distorted time-warped first frame layer includes information of a virtual reality scene, and the distorted non-time warped second frame layer includes notification information for the at least one event.

* * * * *